United States Patent
Shin et al.

(10) Patent No.: US 10,005,496 B2
(45) Date of Patent: Jun. 26, 2018

(54) MODULE BRACKET DEVICE FOR SUSPENSION SYSTEM

(71) Applicants: Hyundai Motor Company, Seoul (KR); ILJIN CO., LTD., Gyeongju-si (KR)

(72) Inventors: Sang Jin Shin, Ansan-si (KR); Byeong Su Yu, Hwaseong-si (KR); Tae Sung Kwon, Gyeongju-si (KR)

(73) Assignees: Hyundai Motor Company, Seoul (KR); ILJIN CO., LTD., Gyeongju-si (KR)

( * ) Notice: Subject to any disclaimer, the term of this patent is extended or adjusted under 35 U.S.C. 154(b) by 182 days.

(21) Appl. No.: 14/959,613

(22) Filed: Dec. 4, 2015

(65) Prior Publication Data

US 2016/0304130 A1  Oct. 20, 2016

(30) Foreign Application Priority Data

Apr. 15, 2015 (KR) .................. 10-2015-0052870

(51) Int. Cl.
*B60G 13/00* (2006.01)
*B60G 15/06* (2006.01)
*B62D 21/11* (2006.01)
*B62D 25/08* (2006.01)

(52) U.S. Cl.
CPC ......... *B62D 25/088* (2013.01); *B60G 13/001* (2013.01); *B60G 13/003* (2013.01); *B60G 15/067* (2013.01); *B60G 15/068* (2013.01); *B62D 21/11* (2013.01)

(58) Field of Classification Search
CPC ...... B60G 13/001; B60G 13/00; B60G 15/06; B60G 15/067; B60G 15/068; B60G 13/003; B62D 25/088; B62D 29/004
See application file for complete search history.

(56) References Cited

U.S. PATENT DOCUMENTS

| 4,618,127 | A | * | 10/1986 | Le Salver | ............ | B60G 15/068 188/321.11 |
| 4,981,287 | A | * | 1/1991 | Cothenet | .............. | B60G 13/001 267/153 |
| 5,040,775 | A | * | 8/1991 | Miyakawa | ........... | B60G 13/003 267/140.13 |
| 5,088,704 | A | * | 2/1992 | Kanda | .................. | B60G 13/003 267/140.13 |
| 5,248,134 | A | * | 9/1993 | Ferguson | ............. | B60G 15/068 188/321.11 |

(Continued)

FOREIGN PATENT DOCUMENTS

KR        10-0811722 B1    3/2008
KR   10-2008-0112606 B1   11/2008
(Continued)

*Primary Examiner* — Barry Gooden, Jr.
(74) *Attorney, Agent, or Firm* — Morgan, Lewis & Bockius LLP (57) ABSTRACT

A module bracket device for a suspension system, which is used to mount a shock absorber at a vehicle body side may include a bush cup having an insulator bush mounted therein, a steel bracket disposed at an upper portion of the bush cup with a gap therebetween, and a module bracket injection molded at a lower portion of the steel bracket while surrounding the bush cup.

7 Claims, 7 Drawing Sheets

(56) References Cited

U.S. PATENT DOCUMENTS

| | | | | |
|---|---|---|---|---|
| 5,263,692 A | * | 11/1993 | Ito | B60G 15/068 267/140.12 |
| 5,382,044 A | | 1/1995 | Smith et al. | |
| 5,467,971 A | * | 11/1995 | Hurtubise | B60G 15/068 188/322.12 |
| 5,873,565 A | * | 2/1999 | Allaire | B60G 13/003 267/292 |
| 6,394,436 B1 | * | 5/2002 | Schnaars | B60G 13/003 267/141.4 |
| 6,398,202 B1 | * | 6/2002 | Schaible | B60G 13/003 188/321.11 |
| 6,446,931 B1 | * | 9/2002 | Hayashi | B60G 15/067 248/635 |
| 7,938,418 B1 | * | 5/2011 | Coombs | B60G 15/068 267/220 |
| 8,439,336 B2 | * | 5/2013 | Moore | B60G 15/068 267/140.13 |
| 9,539,872 B2 | * | 1/2017 | Kim | B60G 13/003 |
| 2003/0025257 A1 | * | 2/2003 | Handke | F16F 9/54 267/220 |
| 2003/0127788 A1 | * | 7/2003 | Graeve | B60G 13/003 267/219 |
| 2003/0178269 A1 | * | 9/2003 | Hayashi | B60G 13/003 188/321.11 |
| 2004/0168870 A1 | * | 9/2004 | Handke | B60G 15/068 188/321.11 |
| 2004/0245691 A1 | * | 12/2004 | Handke | B60G 15/068 267/292 |
| 2005/0063630 A1 | * | 3/2005 | Handke | B60G 15/068 384/617 |
| 2005/0093286 A1 | * | 5/2005 | Oh | B60G 7/02 280/788 |
| 2005/0242542 A1 | * | 11/2005 | Handke | B60G 15/063 280/124.155 |
| 2007/0144850 A1 | * | 6/2007 | Hattori | B60G 3/06 188/322.16 |
| 2008/0197552 A1 | * | 8/2008 | Winocur | B60G 15/068 267/195 |
| 2009/0020930 A1 | * | 1/2009 | Wirges | B60G 15/068 267/140.13 |
| 2009/0116772 A1 | * | 5/2009 | Herman | B60G 13/003 384/224 |
| 2010/0006382 A1 | * | 1/2010 | Ahn | B60G 13/003 188/321.11 |
| 2010/0117325 A1 | * | 5/2010 | Lee | B60G 13/003 280/124.155 |
| 2012/0049428 A1 | * | 3/2012 | Moore | B60G 15/068 267/220 |
| 2012/0292149 A1 | * | 11/2012 | Matsumura | B60G 15/068 188/321.11 |
| 2012/0292841 A1 | * | 11/2012 | Corbett | B60G 15/068 267/217 |
| 2013/0187320 A1 | * | 7/2013 | Henselmeyer | B60G 13/003 267/292 |
| 2013/0249180 A1 | * | 9/2013 | Matsumura | B60G 99/00 280/124.1 |
| 2013/0277898 A1 | * | 10/2013 | Vartolo | B60G 13/003 267/66 |
| 2014/0049019 A1 | * | 2/2014 | Ahn | B62D 21/09 280/124.155 |
| 2014/0306419 A1 | * | 10/2014 | McMullen | B60G 15/067 280/124.155 |
| 2015/0003761 A1 | * | 1/2015 | Nagashima | F16C 33/74 384/297 |
| 2015/0266351 A1 | * | 9/2015 | Schoenherr | B60G 11/22 267/292 |
| 2016/0059659 A1 | * | 3/2016 | Bussit | F16C 27/066 384/611 |
| 2016/0146253 A1 | * | 5/2016 | Weiss, II | F16F 9/54 188/321.11 |
| 2016/0185175 A1 | * | 6/2016 | Kim | B60G 13/003 280/124.155 |
| 2016/0221409 A1 | * | 8/2016 | Jang | B60G 15/068 |
| 2016/0223023 A1 | * | 8/2016 | Lee | F16F 1/127 |

FOREIGN PATENT DOCUMENTS

| | | |
|---|---|---|
| KR | 10-2012-0033836 A | 4/2012 |
| KR | 10-2014-0042563 A | 4/2014 |
| KR | 10-1450755 B1 | 10/2014 |

* cited by examiner

MODULE BRACKET DEVICE FOR SUSPENSION SYSTEM

CROSS-REFERENCE TO RELATED APPLICATION

The present application claims priority to Korean Patent Application No. 10-2015-0052870 filed Apr. 15, 2015, the entire contents of which is incorporated herein for all purposes by this reference.

BACKGROUND OF THE INVENTION

Field of the Invention

The present disclosure relates to a module bracket device for a suspension system, which is used to mount a shock absorber of the suspension system at a vehicle body side. More particularly, it relates to a module bracket device for a suspension system, which is manufactured by using an engineering plastic material to reduce a weight, while still having the existing strength and rigidity.

Description of Related Art

In general, a suspension system for a vehicle is an apparatus that is disposed between a vehicle body and a vehicle wheel, and connects these two rigid bodies using a single or a plurality of links, serves to mechanically and appropriately adjust relative motion between the vehicle body and the vehicle wheel, and serves to absorb impact from the road surface so as to prevent the impact from being transmitted to the vehicle body or occupants.

Recently, various types of suspension systems have been developed and applied to the vehicle. The suspension system supports portions between the vehicle body and the vehicle wheel by using a chassis spring (coil spring), a shock absorber, and the like, an insulator is installed at an upper end of the shock absorber, the insulator is coupled to a mounting bracket disposed at an upper end of the shock absorber, and the mounting bracket is fixed to the vehicle body. Further, upper arms may be mounted at both sides of the mounting bracket.

Meanwhile, in a module bracket device for a suspension system in the related art, which is used to mount a shock absorber of the suspension system at the vehicle body side, an upper end of the shock absorber is mounted at the vehicle body side, by a structure in which a top mount assembly made of a steel material and a rubber material and a top mount bearing made of a plastic material are coupled to a module bracket made of a steel or aluminum material, and as a result, there are problems in that bolting and press-fit processes are required to be carried out between components, whereby manufacturing costs and time are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a module bracket device for a suspension system, in which components made of a steel material and components made of an engineering plastic material are integrally configured by structurally coupling these components without performing a bolting or press-fit process, and an insulator bush is integrally formed, thereby reducing weights of the components while maintaining the existing strength and rigidity.

According to various aspects of the present invention, a module bracket device for a suspension system, which is used to mount a shock absorber at a vehicle body side, may include a bush cup having an insulator bush mounted therein, a steel bracket disposed at an upper portion of the bush cup with a gap therebetween, and a module bracket injection molded at a lower portion of the steel bracket while surrounding the bush cup.

A plurality of first fastening holes may be formed in a first raised portion formed at a central portion of the steel bracket, and an upper portion of the module bracket, which is formed between a lower portion of the first raised portion and the bush cup, and an uppermost portion of the module bracket, which is formed at an upper portion of the first raised portion, are integrally connected to each other through the first fastening holes.

A plurality of second fastening holes may be formed in a second raised portion formed at a central portion of the steel bracket, and an intermediate portion of the module bracket, which is formed at a lower portion of the second raised portion, and a fastening pin portion, which is formed at an upper portion of the second raised portion, may be integrally connected to each other through the second fastening holes.

An edge portion of the module bracket may be formed to surround an edge portion of the steel bracket.

Upper arm insertion portions may be formed at both sides of the steel bracket, and upper arm brackets, to which steel inserts are joined, may be joined to the upper arm insertion portions at positions opposite to upper arm mounting holes.

The module bracket may include a same material as the bush cup.

The module bracket and the bush cup may include an engineering plastic material, and the steel bracket may be made of a steel material.

According to the module bracket device for a suspension system according to the present invention, structural coupling force between the steel bracket and the module bracket, which are made of two types of materials, is improved during a process of injection molding the module bracket, and the bush cup having the insulator bush mounted therein is mounted in the module bracket that is made of the same material as the bush cup, thereby reducing the weight compared to the related art, while still implementing the existing strength and rigidity.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
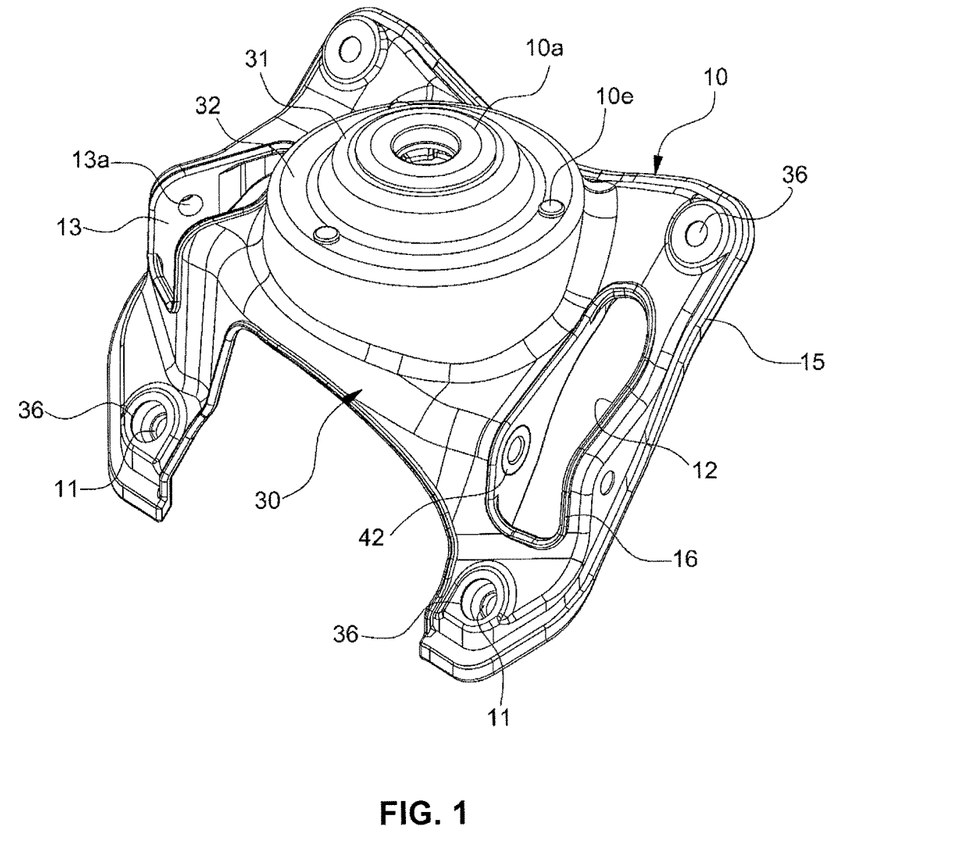
FIG. 1 is a top perspective view illustrating an exemplary module bracket device for a suspension system according to the present invention.
Figure 2:
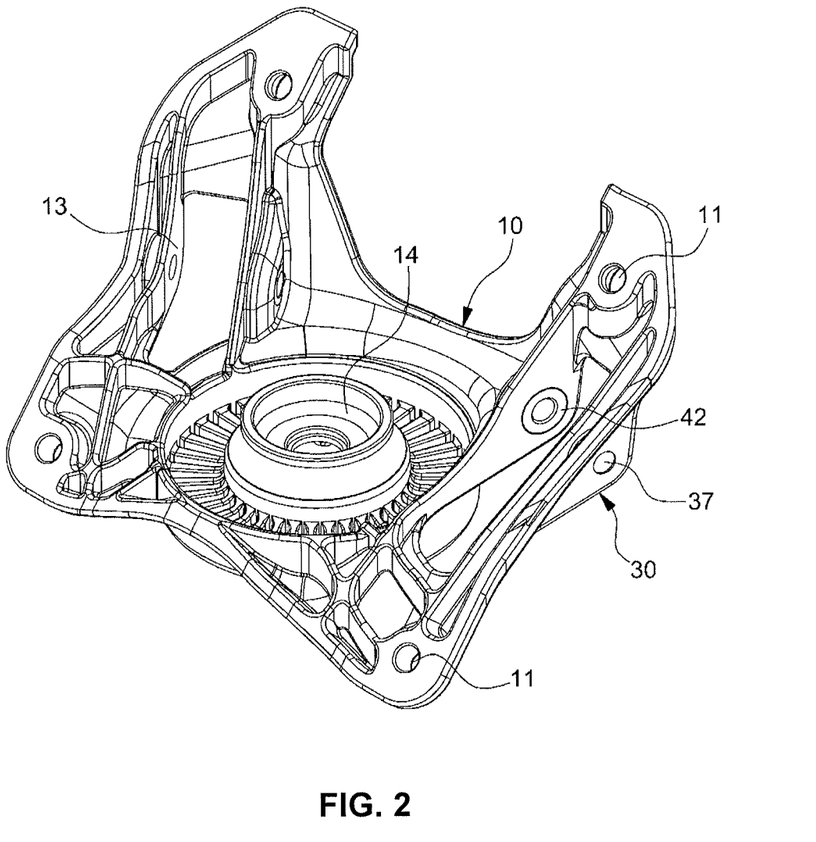
FIG. 2 is a bottom perspective view illustrating the exemplary module bracket device for a suspension system according to the present invention.
Figure 3:
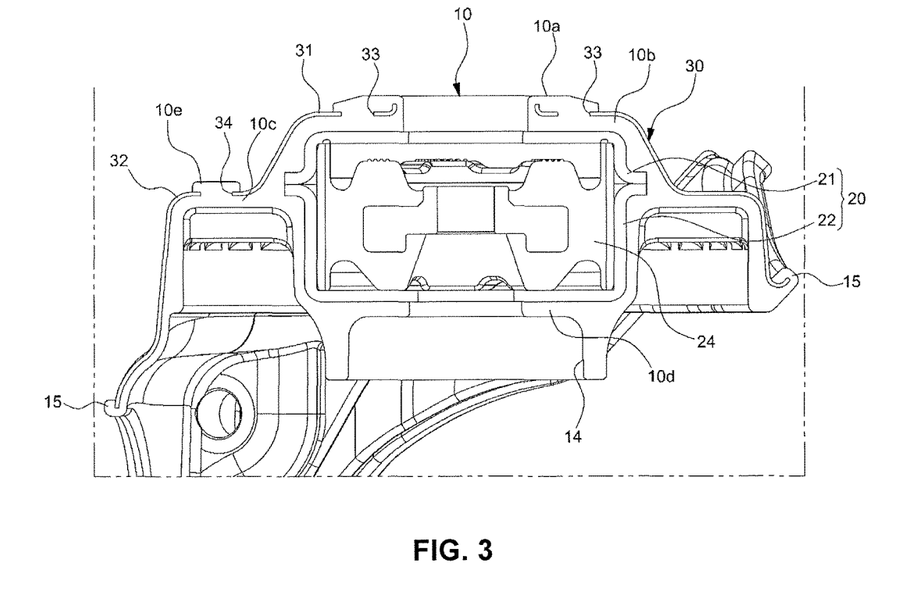
FIG. 3 is a cross-sectional view illustrating the exemplary module bracket device for a suspension system according to the present invention.

A module bracket device for a suspension system according to the present invention is used to mount a shock absorber at a vehicle body side, and supports an upper end portion of the shock absorber disposed between a vehicle body and a vehicle wheel so that the shock absorber is connected to the vehicle body side. As illustrated in FIG. 1 to FIG. 3, the module bracket device includes a module bracket 10, a bush cup 20 which has an insulator bush 24 mounted therein, a steel bracket 30, steel inserts 42, and upper arm brackets 40.

The module bracket 10 is used to mount the shock absorber for a suspension system at the vehicle body side, and injection-molded using an engineering plastic material that is light in weight and has high strength properties.

The module bracket 10 has a plurality of mounting holes 11 which is used to couple the module bracket 10 to the vehicle body, upper arm insertion portions 12 into which one side of an upper arm is inserted and mounted, and upper arm mounting portions 13 to which a rotating shaft of the upper arm is mounted. The bush cup 20 having the insulator bush 24 mounted therein is inserted into the module bracket 10, the steel bracket 30 is integrally joined to an upper side of the module bracket 10, and a shock absorber mounting hole 14, which is used to mount the shock absorber, is formed at a lower portion of the module bracket 10.

The shock absorber penetrates the shock absorber mounting hole 14, and is coupled to the insulator bush 24 inside the bush cup 20.

When the module bracket 10 is injection-molded, edge portions 15 and 16 of the module bracket 10 are bent to surround an edge portion of the steel bracket 30, such that a structural connection between the module bracket 10 and the steel bracket 30 becomes rigid.

For example, the module bracket 10 may be made of glass fiber reinforced plastic (GFRP) in which long glass fiber (LGF) and polyamide (PA) are combined.

The bush cup 20 is a housing that has the insulator bush 24 mounted therein in a way that the insulator bush 24 is surrounded by the bush cup 20. The bush cup 20 includes an upper cup 21 and a lower cup 22 that are made of an engineering plastic material identical to the engineering plastic material of the module bracket 10, and the upper cup 21 and the lower cup 22 are assembled to each other with the insulator bush 24 interposed therebetween. The bush cup 20 is inserted into a mold when the module bracket 10 is injection-molded, and mounted between an upper portion 10b and a lower portion 10d of the module bracket 10.

The steel bracket 30 is used to mount the shock absorber at the vehicle body side together with the module bracket 10, and integrally joined to an upper side of the module bracket 10. The steel bracket 30 is made of a steel material having high strength properties, and may be made of a plate material having a predetermined thickness, for example.

Figure 5:
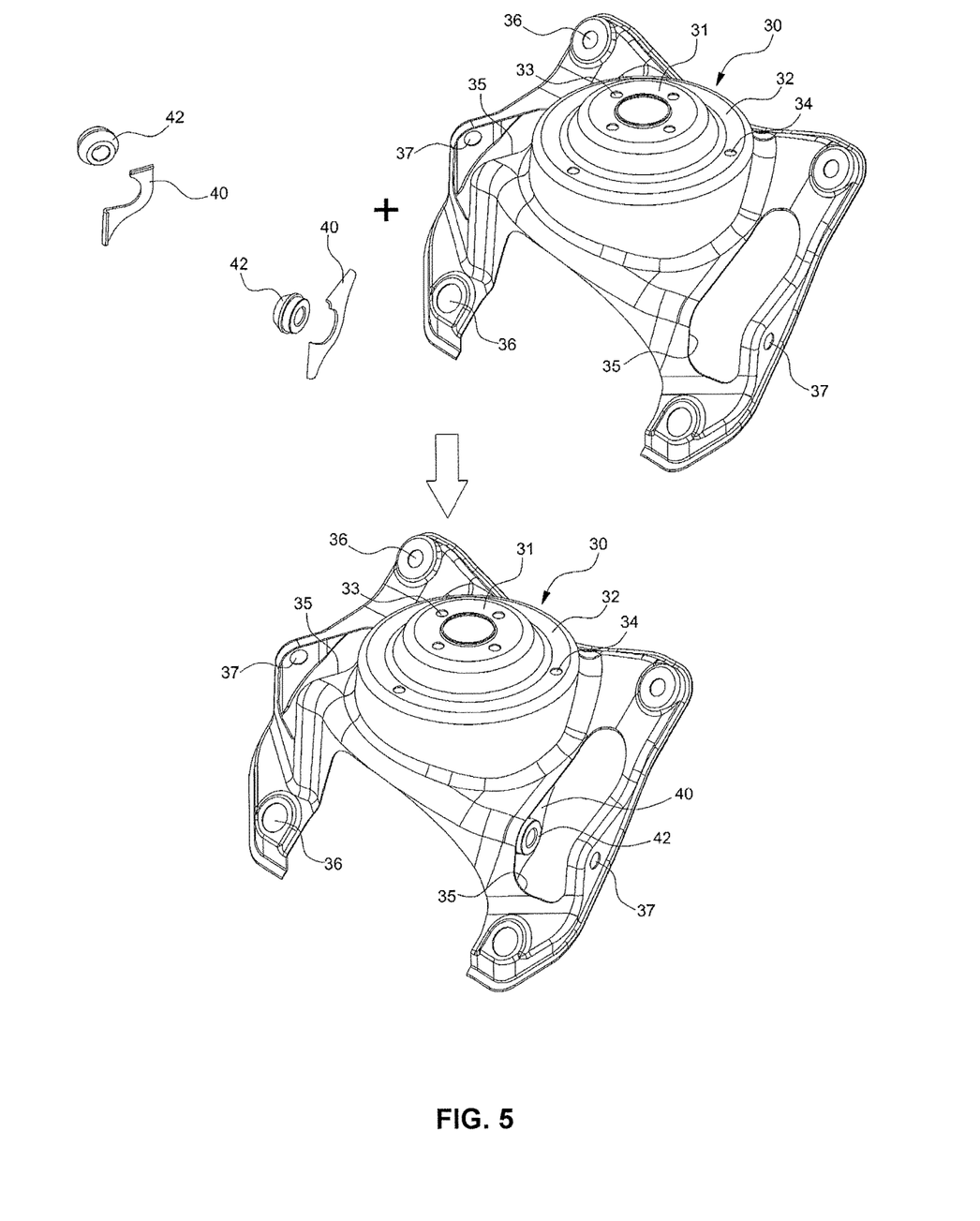

As illustrated in FIG. 3 and FIG. 5, a first raised portion 31, which is raised upward, is formed at a central portion of the steel bracket 30, and a second raised portion 32, which is raised to be smaller in height than the first raised portion 31, is formed at an outer periphery of the first raised portion 31.

The first raised portion 31 has a plurality of first fastening holes 33 that is disposed to be spaced apart from each other at equal intervals, and the second raised portion 32 has a plurality of second fastening holes 34 that is disposed to be spaced apart from each other at equal intervals.

The upper portion 10b of the module bracket 10, which is formed between a lower portion of the first raised portion 31 and the bush cup 20, and an uppermost portion 10a of the module bracket 10, which is formed at an upper portion of the first raised portion 31, are formed to be integrally connected to each other through the first fastening holes 33, and an intermediate portion 10c of the module bracket 10, which is formed at a lower portion of the second raised portion 32, and the fastening pin portion 10e, which is formed at an upper portion of the second raised portion 32, are formed to be integrally connected to each other through the second fastening holes 34, such that a structural connection between the steel bracket 30 and the module bracket 10 is more enhanced.

The structural connection may be made by inserting the steel bracket 30 and the bush cup 20 into the mold and injecting a resin for injection molding when the module bracket 10 is injection-molded, and in this case, the module bracket 10 is formed by filling the first fastening holes 33 and the second fastening holes 34 with the resin for injection molding the module bracket 10.

In this case, the steel bracket 30 and the bush cup 20 are inserted into the mold with a predetermined gap therebetween, and the resin for injection molding the module bracket 10 is formed at a lower portion of the steel bracket 30 while surrounding the bush cup 20.

As described above, since the first and second fastening holes 33 and 34, which may be filled with the resin for injection molding the module bracket 10, are provided in the first and second raised portions 31 and 32 of the steel bracket 30, the structural connection between the steel bracket 30 made of a steel material and the module bracket 10 made of an engineering plastic material may become more rigid, such that coupling force between the steel bracket 30 and the module bracket 10 formed at a lower portion of the steel bracket 30 is increased, and the steel bracket 30 and the module bracket 10 are prevented from being separated from each other.

The steel bracket 30 has a plurality of mounting holes 36 which is used to couple the steel bracket 30 to the vehicle body, upper arm insertion portions 35 into which one side of the upper arm is inserted and mounted, and upper arm mounting holes 37 to which the rotating shaft of the upper arm is mounted. The mounting holes 36, the upper arm insertion portions 35, and the upper arm mounting holes 37 are positioned to be stacked on the mounting holes 11, the upper arm insertion portions 12, and the upper arm mounting portions 13 of the module bracket 10, respectively, and then joined thereto.

The mounting holes 36 are formed at an edge of the steel bracket 30, the upper arm insertion portions 35 are formed at both sides of the steel bracket 30, and the upper arm mounting holes 37 are formed to be adjacent to one side of the upper arm insertion portions 35.

A mounting hole 13a, which is formed at a center of the upper arm mounting portion 13 of the module bracket 10, is positioned coaxially with the upper arm mounting hole 37.

The steel insert 42 is used to mount one side of the upper arm, supports one side the upper arm that is connected between the module bracket 10 and the vehicle body, and is welded on the upper arm bracket 40 that is joined to one side of the steel bracket 30.

The steel insert 42 and the upper arm bracket 40 are made of a steel material having rigidity. For example, the steel insert 42 is made of low carbon steel (S20C), and formed in a cylindrical shape so that the rotating shaft of the upper arm may penetrate and may be assembled to the steel insert 42. Further, the upper arm bracket 40 may be made of the same material as the steel bracket 30.

According to the module bracket device for a suspension system of the present invention, which is configured as described above, components made of a steel material and components made of an engineering plastic material are integrally configured by structurally coupling these components through welding and injection molding processes without performing the existing bolting and press-fit processes, thereby reducing weights of the components compared to the related art while maintaining the existing strength and rigidity.

Although not illustrated in the drawings, the module bracket device may be mounted between the vehicle body and the shock absorber. In this case, the insulator bush 24 may be disposed at an upper end of the shock absorber, the insulator bush 24 may be configured integrally inside the module bracket 10, and may be fixedly mounted to the vehicle body side by the steel bracket 30 and the mounting holes 11 of the module bracket 10. Further, the upper arm may be mounted at both sides of the module bracket device by means of the steel inserts 42.

Here, a process of manufacturing the module bracket device for a suspension system of the present invention, which is configured as described above, will be described below with reference to the attached FIG. 4 to FIG. 6B.

As illustrated in FIG. 4 to FIG. 6B, first, the insulator bush 24, the bush cup 20, the steel insert 42, the upper arm bracket 40, and the steel bracket 30 are manufactured and prepared.

Figure 4:
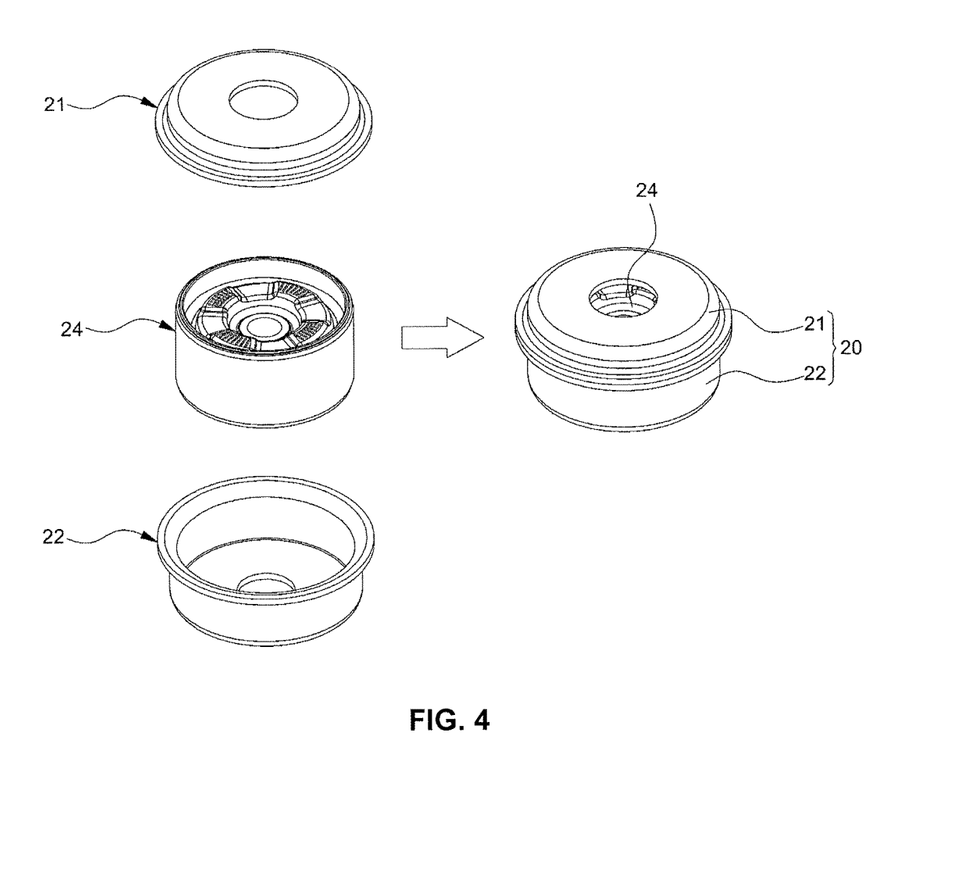
FIG. 4, FIG. 5, FIG. 6A and FIG. 6B are views for explaining a process of manufacturing the exemplary module bracket device for a suspension system according to the present invention.

As illustrated in FIG. 4, the upper cup 21 and the lower cup 22 of the bush cup 20 are assembled to face each other with the prepared insulator bush 24 interposed therebetween, such that the insulator bush 24 is mounted in the bush cup 20.

As illustrated in FIG. 5, the steel insert 42 is fixedly joined to the upper arm bracket 40 by welding, and thereafter, the upper arm bracket 40 is fixedly joined to a predetermined position of the steel bracket 30 (one side of the upper arm insertion portion) by welding. In this case, the respective upper arm brackets 40, which are joined to the upper arm insertion portions 35 at both sides, are disposed at the opposite sides to the upper arm mounting holes 37 so that the steel inserts 42 may coaxially face the upper arm mounting holes 37 of the steel bracket 30.

Next, electrodeposition coating is performed to the steel bracket 30 to which the upper arm brackets 40 are joined, thereby forming a coating film on surfaces of the steel bracket 30, the upper arm brackets 40, and the steel inserts 42 using an electrodeposition coating material.

Figure 6A:
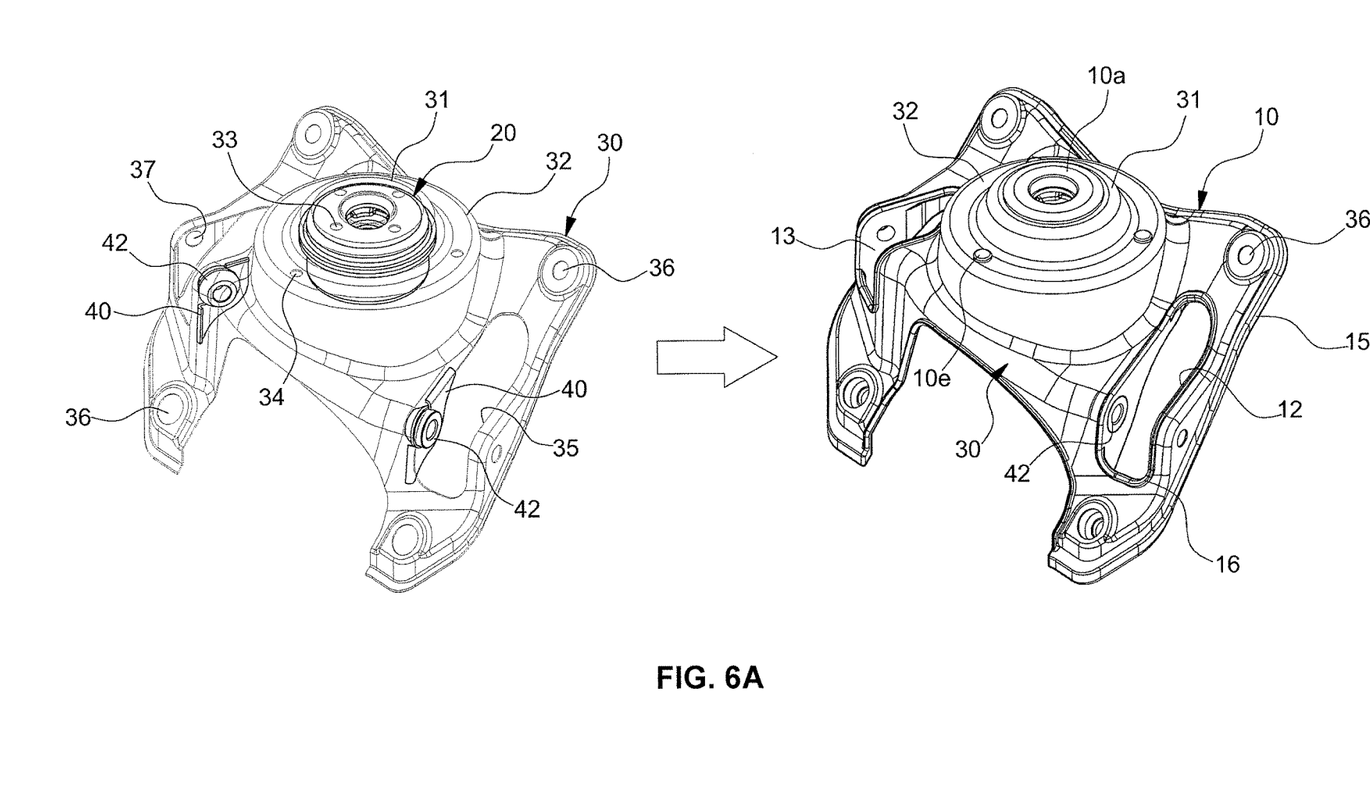
Figure 6B:
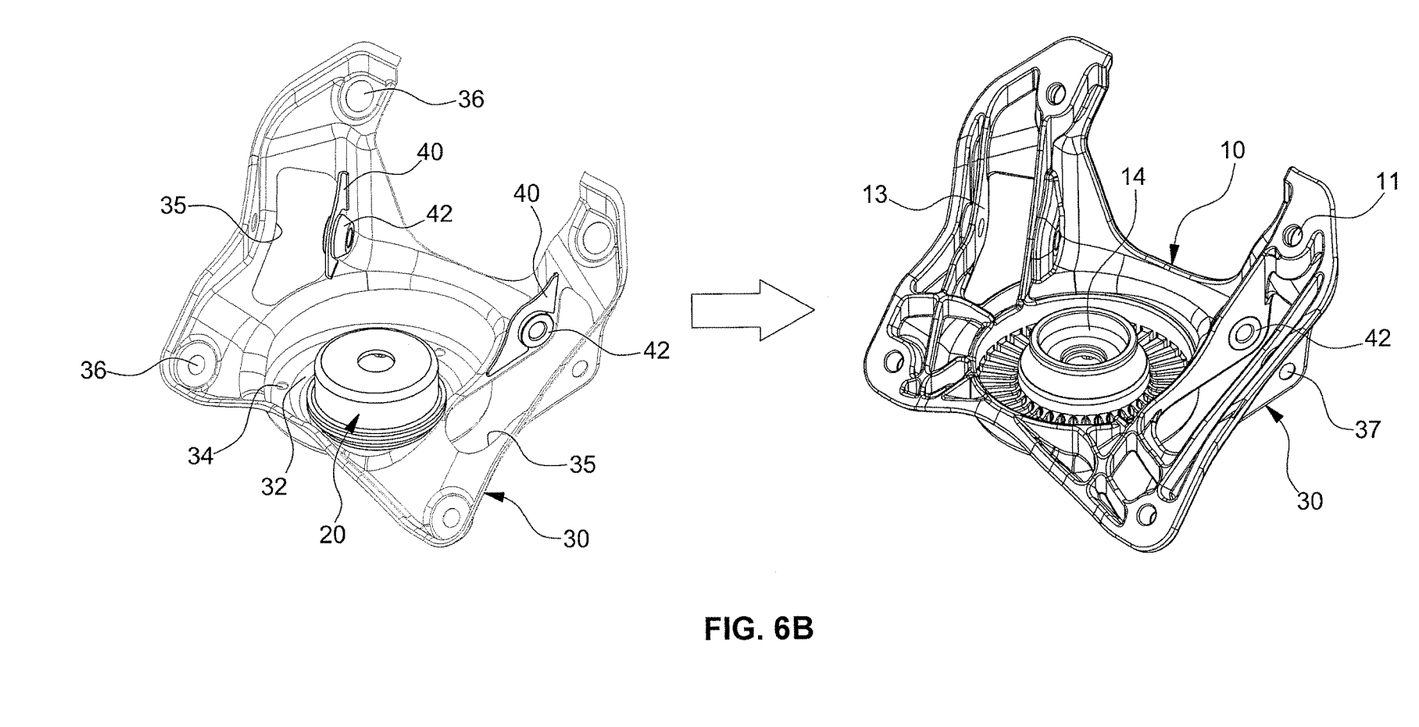

Next, the bush cup 20, which has the insulator bush 24 mounted therein, and the steel bracket 30 are inserted into the mold for injection molding the module bracket 10, and thereafter, the resin for injection molding, for example, GFRP is injected into the mold, and as a result, the module bracket 10 is formed at the lower portion of the steel bracket 30, as illustrated in FIG. 6A and FIG. 6B.

In this case, the steel bracket 30 and the bush cup 20 are inserted into the mold in a state in which the steel bracket 30 is stacked on the bush cup 20 with a predetermined gap therebetween (see FIG. 3), and the edge portion of the module bracket 10 is formed to be bent so as to surround the edge portion of the steel bracket 30.

Referring to FIG. 3, the first fastening holes 33 of the steel bracket 30 are filled with the resin for injection molding the module bracket 10 such that the upper portion 10b, which is formed between the lower portion of the first raised portion 31 and the bush cup 20, and the uppermost portion 10a, which is formed at the upper portion of the first raised portion 31, are integrally connected to each other, and the second fastening holes 34 of the steel bracket 30 is filled with the resin such that the intermediate portion 10c, which is formed at the lower portion of the second raised portion 32, and the fastening pin portion 10e, which is formed at the upper portion of the second raised portion 32, are integrally connected to each other.

Here, since the bush cup 20, which surrounds the insulator bush 24, is made of the same engineering plastic material as the module bracket 10, the bush cup 20 is integrally attached to the module bracket 10, like a single component, by heat of the resin for injection molding that is injected into the mold. Therefore, the bush cup 20 and the module bracket 10 are manufactured as an integrated engineering plastic component without performing a separate bonding process, thereby solving a problem that occurs when two types of materials are joined, and configuring the insulator bush 24 and the module bracket 10 as an integrated component.

As described above, the bush cup 20 having the insulator bush 24 mounted therein is made of the same material as the module bracket 10, thereby omitting components for coupling the bush cup 20 and the module bracket 10, and reducing weights of the components accordingly.

The module bracket device for a suspension system, which is manufactured as described above, has no separate assembly structure between the steel bracket 30 and the module bracket 10, but the first fastening holes 33 and the second fastening holes 34, which are formed at the central portion of the steel bracket 30, are filled with the resin for injection molding the module bracket 10, such that stable three-point-fastening and four-point-fastening structures may be implemented without using separate fastening components, thereby improving structural coupling force between the steel bracket 30 and the module bracket 10.

According to the module bracket device for a suspension system, since the module bracket 10 is formed by injecting the resin for injection molding into the lower portion of the steel bracket 30, it is possible to omit a separate process and a separate component for coupling components, and reduce weights and costs. Further, since the bush cup 20, which is integrally connected with the module bracket 10 like a single component, supports the insulator bush 24 while surrounding the entire insulator bush 24, it is possible to ensure strength at a level shown in the related art.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A module bracket device for a suspension system, which is used to mount a shock absorber at a vehicle body side, the module bracket device comprising:
   a bush cup having an insulator bush mounted therein;
   a steel bracket disposed at an upper portion of the bush cup with a gap therebetween; and
   a module bracket injection molded at a lower portion of the steel bracket while surrounding the bush cup, wherein the module bracket comprises a same material as the bush cup.

2. The module bracket device of claim 1, wherein a plurality of second fastening holes is formed in a second raised portion formed at a central portion of the steel bracket, and an intermediate portion of the module bracket, which is formed at a lower portion of the second raised portion, and a fastening pin portion, which is formed at an upper portion of the second raised portion, are integrally connected to each other through the second fastening holes.

3. The module bracket device of claim 1, wherein an edge portion of the module bracket is formed to surround an edge portion of the steel bracket.

4. The module bracket device of claim 1, wherein upper arm insertion portions are formed at both sides of the steel bracket, and upper arm brackets, to which steel inserts are joined, are joined to the upper arm insertion portions at positions opposite to upper arm mounting holes.

5. The module bracket device of claim 1, wherein the module bracket and the bush cup comprise an engineered plastic material, and the steel bracket is made of a steel material.

6. The module bracket device of claim 1, wherein a plurality of first fastening holes is formed in a first raised portion formed at a central portion of the steel bracket, and an upper portion of the module bracket, which is formed between a lower portion of the first raised portion and the bush cup, and an uppermost portion of the module bracket, which is formed at an upper portion of the first raised portion, are integrally connected to each other through the first fastening holes.

7. The module bracket device of claim 6, wherein a plurality of second fastening holes is formed in a second raised portion formed at the central portion of the steel bracket, and an intermediate portion of the module bracket, which is formed at a lower portion of the second raised portion, and a fastening pin portion, which is formed at an upper portion of the second raised portion, are integrally connected to each other through the second fastening holes.

* * * * *